United States Patent
Funk et al.

(10) Patent No.: US 8,633,285 B2
(45) Date of Patent: Jan. 21, 2014

(54) METHOD FOR PRODUCING WATER-ABSORBING POLYMER PARTICLES

(75) Inventors: Rüdiger Funk, Niedernhausen (DE); Matthias Weismantel, Jossgrund-Oberndorf (DE); Dominicus van Esbroeck, Nanjing (CN); Filip Mees, Grobbendonk (BE)

(73) Assignee: BASF SE, Ludwigshafen (DE)

( * ) Notice: Subject to any disclaimer, the term of this patent is extended or adjusted under 35 U.S.C. 154(b) by 615 days.

(21) Appl. No.: 12/746,907

(22) PCT Filed: Dec. 8, 2008

(86) PCT No.: PCT/EP2008/010388
§ 371 (c)(1),
(2), (4) Date: Jun. 8, 2010

(87) PCT Pub. No.: WO2009/077100
PCT Pub. Date: Jun. 25, 2009

(65) Prior Publication Data
US 2010/0273942 A1    Oct. 28, 2010

(30) Foreign Application Priority Data
Dec. 17, 2007   (EP) .................................. 07123347

(51) Int. Cl.
C08F 2/01 (2006.01)
C08F 2/44 (2006.01)
C08F 20/06 (2006.01)

(52) U.S. Cl.
USPC ............. 526/66; 524/321; 524/461; 524/773; 524/853; 526/201; 526/317.1

(58) Field of Classification Search
USPC ............ 524/321, 461, 773, 853; 526/66, 201, 526/317.1
See application file for complete search history.

(56) References Cited

U.S. PATENT DOCUMENTS

| 5,330,822 A * | 7/1994 | Berg et al. ..................... 428/192 |
| 6,124,391 A | 9/2000 | Sun et al. |
| 6,710,141 B1 | 3/2004 | Heide et al. |
| 2004/0186229 A1 * | 9/2004 | Heide et al. ................... 524/832 |
| 2006/0032081 A1 * | 2/2006 | Belkhiria et al. ............... 34/568 |
| 2008/0004408 A1 | 1/2008 | Stueven et al. |
| 2008/0188821 A1 | 8/2008 | Losch et al. |
| 2009/0008220 A1 | 1/2009 | Hillebrecht et al. |

FOREIGN PATENT DOCUMENTS

| DE | 102005002412 A1 | 7/2006 |
| WO | WO-00/10619 A1 | 3/2000 |
| WO | WO-01/38402 A1 | 5/2001 |
| WO | WO-03022896 A1 | 3/2003 |
| WO | WO-2006/034806 A1 | 4/2006 |
| WO | WO-2007/003619 A1 | 1/2007 |

OTHER PUBLICATIONS

Air Liquide, Specialty Gas Catalog, 2006.*
Buchholz, Fredric L., et al.. *Modern Superabsorbent Polymer Technology*, "Solution Polymerization: Unit Operations and Their Effect on Product Quality." New York: John Wiley & Sons, Inc., 1998, pp. 71-103.
International Search Report in PCT Application No. PCT/EP2008/010388 dated Mar. 11, 2009.

* cited by examiner

*Primary Examiner* — Richard A Huhn
(74) *Attorney, Agent, or Firm* — Marshall, Gerstein & Borun LLP

(57) ABSTRACT

A process for producing water-absorbing polymer particles, comprising the addition of a solid additive to a polymer gel by means of a conveying screw (1), wherein the solid additive and a gas volume flow are fed to the conveying screw (1) by means of an addition channel (2).

9 Claims, 1 Drawing Sheet

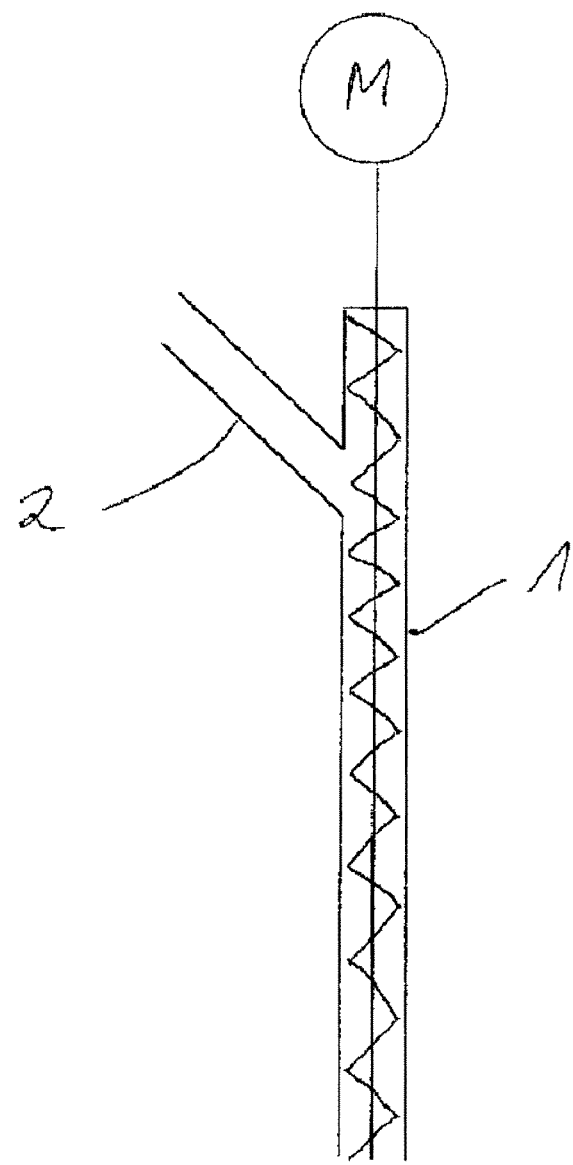

METHOD FOR PRODUCING WATER-ABSORBING POLYMER PARTICLES

CROSS-REFERENCE TO RELATED APPLICATIONS

This is the U.S. national phase of International Application No. PCT/EP2008/010388, filed Dec. 8, 2008, which claims the benefit of European Patent Application No. 07123347.2, filed Dec 17, 2007.

The present invention relates to a process for producing water-absorbing polymer particles, comprising the addition of a solid additive to a polymer gel by means of a conveying screw (1), wherein the solid additive and a gas volume flow are fed to the conveying screw (1) by means of an addition channel (2).

The production of water-absorbing polymer particles is described in the monograph "Modern Superabsorbent Polymer Technology", F. L. Buchholz and A. T. Graham, Wiley-VCH, 1998, pages 71 to 103.

Water-absorbing polymers are used to produce diapers, tampons, sanitary napkins and other hygiene articles, but also as water-retaining agents in market gardening.

WO 2001/38402 A1 and WO 2003/22896 A1 disclose a process for continuously producing water-absorbing polymer particles to a kneading reactor with at least two axially parallel shafts, wherein the reaction mixture is transported through the kneading reactor in axial direction.

WO 2007/003619 A1 discloses an apparatus for adding solid, viscous liquid or solvent-disperse additives to a reactor interior of a reactor for producing water-absorbing polymer particles. In order to prevent oxygen from being introduced into the reaction chamber with the additive supplied, the apparatus can be flushed with an inert gas.

It was an object of the present invention to provide an improved process for producing water-absorbing polymer particles.

The object is achieved by a process for producing water-absorbing polymer particles by polymerizing an aqueous monomer solution or suspension comprising a) at least one ethylenically unsaturated monomer which bears acid groups and may be at least partly neutralized,
b) at least one crosslinker,
c) optionally one or more ethylenically and/or allylically unsaturated monomers copolymerizable with the monomers mentioned under a) and
d) optionally one or more water-soluble polymers, comprising the steps of i) solution polymerization in a polymerization reactor to obtain a polymer gel in the polymerization reactor,
ii) addition of at least one solid additive during and/or after the solution polymerization to the polymer gel by means of at least one conveying screw (1), the solid additive being fed to the conveying screw (1) by means of an addition channel (2), and
iii) mixing the solid additive into the polymer gel, wherein a gas volume flow is additionally fed via the addition channel (2) to the conveying screw (1), such that the gas velocity of the gas volume flow in the addition channel (2) in the direction of the conveying screw (1) is at least 0.05 m/s and the dew point of the gas volume flow is at least 20° C. below the lowest inner wall temperature of conveying screw (1) and addition channel (2).

FIG. 1 shows a conveying screw (1) with an addition channel (2).

The gas velocity of the gas volume flow is preferably from 0.1 to 1 m/s, more preferably from 0.12 to 0.5 m/s, most preferably from 0.15 to 0.25 m/s.

The dew point of the gas volume flow is preferably at least 30° C., more preferably at least 40° C., most preferably at least 50° C., below the lowest inner wall temperature of conveying screw (1) and addition channel (2), i.e. the gas volume flow should be very substantially dry. The dew point is the temperature at which the partial water vapor pressure intersects with the boiling line of water.

The amount of gas to be used is determined by the cross section of the addition channel (2). For example, the gas velocity in the addition channel (2), at a cross section of 150 mm and a gas rate of from 10 to 15 $m^3$/h, is from 0.16 to 0.23 m/s.

The solid additive can be metered and mixed into the polymer gel either in a polymerization reactor suitable for mixing or in a separate apparatus, for example an extruder. In a preferred embodiment of the present invention, a kneading reactor is used as the polymerization reactor and the solid additive is metered into the kneading reactor by means of the conveying screw.

The water content of the polymer gel in the course of mixing of the solid additive is preferably from 20 to 80% by weight, more preferably from 30 to 70% by weight, most preferably from 40 to 60% by weight. The water content is preferably determined analogously to the EDANA (European Disposables and Nonwovens Association) recommended test method No. WSP 230.2-05 "Moisture content", the weight loss being assumed as the water content. Too high a water content leads to increased energy expenditure in the subsequent drying. Too low a water content leads to an excessively high mechanical power consumption in the mixing and to an inadequate mixing result.

In the course of mixing, the polymer gel preferably has a temperature of from 60 to 110° C., more preferably from 70 to 100° C., most preferably from 80 to 95° C.

Useful solid additives include, for example, particulate inorganic or organic solids. Suitable inorganic solids are, for example, silicon dioxide, aluminum oxide, calcium phosphate, calcium sulfate and clay minerals. Suitable organic solids are, for example, starch, modified starch, cellulose, modified cellulose and water-absorbing polymer particles themselves.

For instance, typically water-absorbing polymer particles with an excessively small particle size are removed as undersize during the production and recycled into the production process. Such water-absorbing polymer particles may also have been postcrosslinked or aftertreated in another way. This undersize has, for example, a particle size of less than 300 µm, of less than 250 µm, of less than 180 µm or of less than 150 µm.

The way in which the conveying screw (1) is installed in the process according to the invention is not subject to any restriction. However, the conveying screw (1) is preferably installed vertically.

The temperature of the gas volume flow is preferably from 10 to 100° C., more preferably from 20 to 80° C., most preferably from 30 to 70° C.

In a preferred embodiment of the present invention, an inert gas stream is used as the gas volume flow. Inert gases are gases which cannot react with the constituents of the monomer solution. Suitable inert gases are, for example, nitrogen, carbon dioxide and argon.

The inert gas used is preferably nitrogen, particularly in technical-grade quality. Technical-grade nitrogen comprises typically at least 99.8% by volume of nitrogen and less than 0.0005% by volume of oxygen.

In a preferred embodiment of the present invention, the conveying screw (1) and the addition channel (2) is thermally insulated and/or trace-heated.

The process according to the invention enables more homogeneous and more disruption-free supply of the solid additives via the access channel (2) into the conveying screw (1). The inventive addition of gas prevents the formation of dry, brittle deposits in the conveying screw (1). The deposits can lead to the stoppage of the conveying screw (1) and can be removed only with difficulty. It is also possible for parts of the deposits to break off during the operation of the conveying screw (1) and to get into the polymer gel as cream-colored spots.

It has also been found that colored impurities can occur in the polymer gel when a kneading reactor used as the polymerization reactor has dead spaces flushed only inadequately with gas, preferably an inert gas. To prevent these dead spaces and hence to prevent these impurities in the polymer gel, it is therefore advantageous to meter the gas into the kneading reactor at least two different points.

The metered addition of the gas via at least two addition points enables the establishment of a sufficiently high flow velocity in all gas-filled volume elements of the kneading reactor. The addition of the gas in the kneading reactor is preferably adjusted such that the flow velocity of the gas is not less than 0.05 m/s in any volume element of the kneading reactor. More preferably the minimum flow velocity is 0.1 m/s. Most preferably, the minimum flow velocity is 0.12 m/s, especially 0.15 m/s.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water. Ideally, the monomers a) are miscible with water in any ratio.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

Further suitable monomers a) are, for example, ethylenically unsaturated sulfonic acids such as styrenesulfonic acid and 2-acrylamido-2-methylpropanesulfonic acid (AMPS).

The proportion of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula

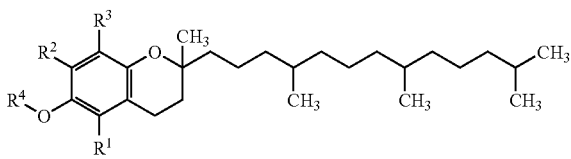

where $R^1$ is hydrogen or methyl, $R^2$ is hydrogen or methyl, $R^3$ is hydrogen or methyl and $R^4$ is hydrogen or an acyl radical having from 1 to 20 carbon atoms.

Preferred $R^4$ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3$=methyl, especially racemic alpha-tocopherol. $R^1$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

Crosslinkers b) are preferably compounds having at least two polymerizable groups which can be polymerized by a free-radical mechanism into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000, for example polyethylene glycol-400 diacrylate.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinker b) is preferably from 0.05 to 1.5% by weight, more preferably from 0.1 to 1% by weight, most preferably from 0.3 to 0.6% by weight, based in each case on monomer a).

Examples of ethylenically unsaturated monomers c) which are copolymerizable with the ethylenically unsaturated, acid-bearing monomers a) are acrylamide, methacrylamide, crotonamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The preparation of a suitable polymer and also further suitable hydrophilic ethylenically unsaturated monomers a) are described in DE 199 41 423 A1, EP 686 650 A1, WO 2001/45758 A1 and WO 2003/104300 A1.

Suitable reactors are kneading reactors or belt reactors. In the kneader, the polymer gel formed in the polymerization of an aqueous monomer solution or suspension is comminuted continuously by, for example, contrarotatory stirrer shafts, as described in WO 2001/38402 A1. The polymerization on the belt is described, for example, in DE 38 25 366 A1 and U.S. Pat. No. 6,241,928. Polymerization in a belt reactor forms a polymer gel which has to be comminuted in a further process step, for example in a meat grinder, extruder or kneader.

The acid groups of the resulting hydrogels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt dryer until the residual moisture content is preferably below 15% by weight and especially below 10% by weight, the water content being determined by EDANA (European Disposables and Nonwovens Association) recommended test method No. WSP 230.2-05 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 25% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes.

Thereafter, the dried hydrogel is typically ground and classified, and the apparatus used for grinding may preferably be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm, very particularly from 300 to 500 µm. The mean particle size of the product fraction may be determined by means of the EDANA (European Disposables and Nonwovens Association) recommended test method No. WSP 220.2-05 "Particle size distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of preferably at least 150 µm, more preferably at least 200 µm, most preferably at least 250 µm, is preferably at least 90% by weight, more preferably at least 95% by weight, most preferably at least 98% by weight.

The proportion of particles with a particle size of preferably at most 850 µm, more preferably at most 700 µm, most preferably at most 600 µm, is preferably at least 90% by weight, more preferably at least 95% by weight, most preferably at least 98% by weight.

To further improve the properties, the polymer particles may be postcrosslinked. Suitable postcrosslinkers are compounds which comprise groups which can form covalent bonds with at least two carboxylate groups of the polymer particles. Suitable compounds are, for example, alkoxysilyl compounds, polyazirindines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 1% by weight, most preferably from 0.05 to 0.2% by weight, based in each case on the polymer.

In a preferred embodiment of the present invention, polyvalent cations are applied to the particle surface in addition to the postcrosslinkers before, during or after the postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer.

The postcrosslinking is typically performed in such a way that a solution of the postcrosslinker is sprayed onto the hydrogel or the dry polymer particles. After the spraying, the polymer particles coated with the postcrosslinker are dried thermally, and the postcrosslinking reaction can take place either before or during the drying.

The spraying of a solution of the postcrosslinker is preferably performed in mixers with moving mixing tools, such as screw mixers, disk mixers, plowshare mixers and paddle mixers. Particular preference is given to horizontal mixers such as plowshare mixers and paddle mixers, very particular preference to vertical mixers. Suitable mixers are, for example, Lödige mixers, Bepex mixers, Nauta mixers, Processall mixers and Schugi mixers.

The postcrosslinkers are typically used as an aqueous solution. The addition of nonaqueous solvent can be used to adjust the penetration depth of the postcrosslinker into the polymer particles.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range from 100 to 250° C., preferably from 120 to 220° C., more preferably from 130 to 210° C., most preferably from 150 to 200° C. The preferred residence time at this temperature in the reaction mixer or dryer is preferably at least 10 minutes, more preferably at least 20 minutes, most preferably at least 30 minutes, and typically at most 60 minutes.

Subsequently, the postcrosslinked polymer can be classified again.

To further improve the properties, the postcrosslinked polymer particles can be coated or subsequently moistened. Suitable coatings for improving the acquisition behavior and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings against the undesired caking tendency of the polymer particles are, for example, fumed silica, such as Aerosil® 200, and surfactants, such as Span® 20.

The water-absorbing polymer particles obtainable by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined analogously to the EDANA (European Disposables and Nonwovens Association) recommended test method No. WSP 241.2-05 "Centrifuge retention capacity".

The invention claimed is:

1. A process for producing water-absorbing polymer particles by polymerizing an aqueous monomer solution or suspension comprising
   a) at least one ethylenically unsaturated monomer which bears acid groups and may be at least partly neutralized,
   b) at least one crosslinker,
   c) optionally one or more ethylenically and/or allylically unsaturated monomer copolymerizable with the monomer mentioned under a), and
   d) optionally one or more water-soluble polymers,
   comprising
   i) solution polymerization in a polymerization reactor to obtain a polymer, gel in the polymerization reactor,
   ii) addition of at least one solid additive during and/or after the solution polymerization to the polymer gel by means of at least one conveying screw (1), the solid additive being fed to the conveying screw (1) by means of an addition channel (2), and
   iii) mixing the solid additive into the polymer gel,
   wherein a gas volume flow is additionally fed via the addition channel (2) to the conveying screw (1), such that a gas velocity of the gas volume flow in the addition channel (2) in a direction of the conveying screw (1) is at least 0.05 m/s and a dew point of the gas volume flow is at least 20° C. below the lowest inner wall temperature of the conveying screw (1) and the addition channel (2), and
   wherein the conveying screw (1) and the addition channel (2) are thermally insulated and/or trace-heated.

2. The process according to claim 1, wherein the polymerization reactor is a kneading reactor and the solid additive is mixed into the polymer gel in the kneading reactor.

3. The process according to claim 1, wherein a water content of the polymer gel in the course of mixing is at least 20% by weight.

4. The process according to claim 1, wherein the polymer gel has a temperature of at least 60° C. in the course of mixing.

5. The process according to claim 1, wherein water-absorbing polymer particles with a particle size of less than 300 μm are used as the solid additive.

6. The process according to claim 1, wherein the conveying screw (1) is installed vertically.

7. The process according to claim 1, wherein the gas is an inert gas.

8. The process according to claim 7, wherein the inert gas is nitrogen.

9. The process according to claim 1, wherein the water-absorbing polymer particles have a centrifuge retention capacity of at least 15 g/g.

\* \* \* \* \*